United States Patent
Grogan et al.

(10) Patent No.: US 10,215,360 B1
(45) Date of Patent: Feb. 26, 2019

(54) VEHICLE LIGHTING DEVICE AND METHOD

(71) Applicant: Stanley Electric Co., Ltd., Tokyo (JP)

(72) Inventors: Teerawan Grogan, London, OH (US);
Aaron M Eberle, Dublin, OH (US);
Takuya Matsumaru, London, OH (US)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/983,272

(22) Filed: May 18, 2018

(51) Int. Cl.
*F21S 43/249* (2018.01)
*F21S 43/40* (2018.01)
*F21S 43/20* (2018.01)

(52) U.S. Cl.
CPC ............. *F21S 43/40* (2018.01); *F21S 43/249* (2018.01); *F21S 43/26* (2018.01)

(58) Field of Classification Search
CPC ........... F21S 43/249; F21S 43/26; F21S 43/40
See application file for complete search history.

(56) References Cited

U.S. PATENT DOCUMENTS

| | | | |
|---|---|---|---|
| 7,111,970 B2 | 9/2006 | Gasquet | |
| 8,752,986 B2 | 6/2014 | Wuerthele et al. | |
| 9,457,708 B2 | 10/2016 | Noritake | |
| 2013/0265791 A1 | 10/2013 | Dassanayake et al. | |
| 2013/0314935 A1 | 11/2013 | Tokieda et al. | |
| 2014/0160777 A1 | 6/2014 | Mugge | |
| 2014/0254186 A1 | 9/2014 | Terai et al. | |
| 2016/0061397 A1 | 3/2016 | Ito et al. | |
| 2016/0103269 A1 | 4/2016 | Narita | |
| 2016/0138773 A1* | 5/2016 | Kawabata | F21S 43/239 362/511 |
| 2016/0208995 A1* | 7/2016 | Yoshino | F21S 43/14 |

FOREIGN PATENT DOCUMENTS

| | | | | |
|---|---|---|---|---|
| EP | 2960574 A1 | * | 12/2015 | ............. F21S 43/14 |
| JP | 2014056694 A | * | 3/2014 | ................ F21S 8/04 |
| JP | 2014-123547 A | | 7/2014 | |
| JP | 2015-115205 A | | 6/2015 | |
| JP | 2016-95996 A | | 5/2016 | |
| JP | 2016-157541 A | | 9/2016 | |

* cited by examiner

*Primary Examiner* — Donald L Raleigh
(74) *Attorney, Agent, or Firm* — Kenealy Vaidya LLP

(57) ABSTRACT

A vehicle lamp can include first and second lamp units or portions that each have a light emission portion that extends across a gap between two vehicle body portions, such as a door panel, quarter panel, trunk lid, etc. The first and second lamp units/portions can be configured such that it appears that the vehicle lamp extends seamlessly and without detectable lighting variation across the gap between vehicle body portions.

20 Claims, 5 Drawing Sheets

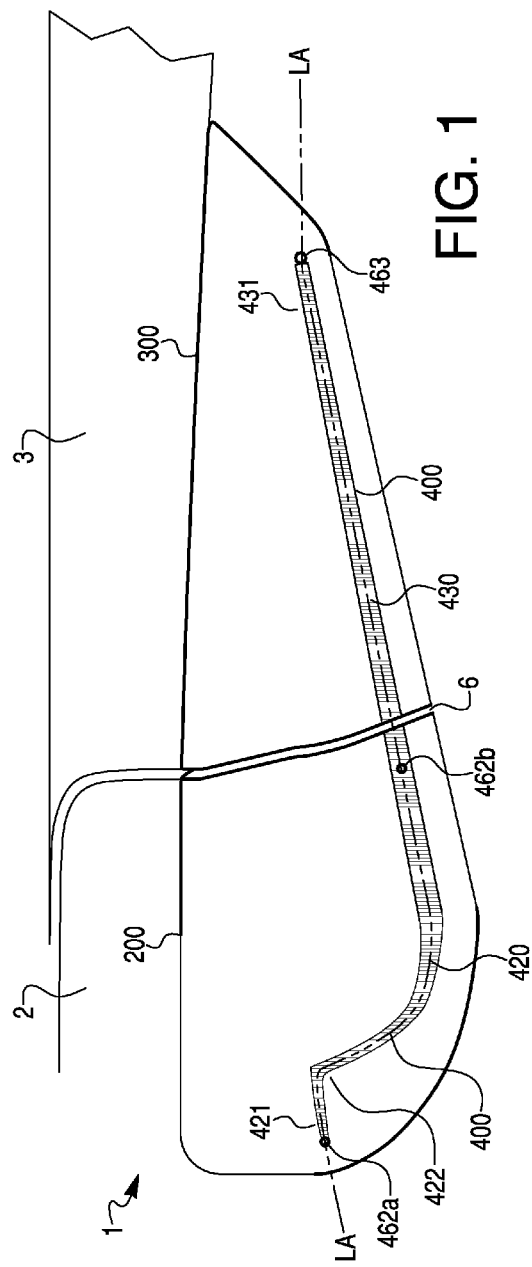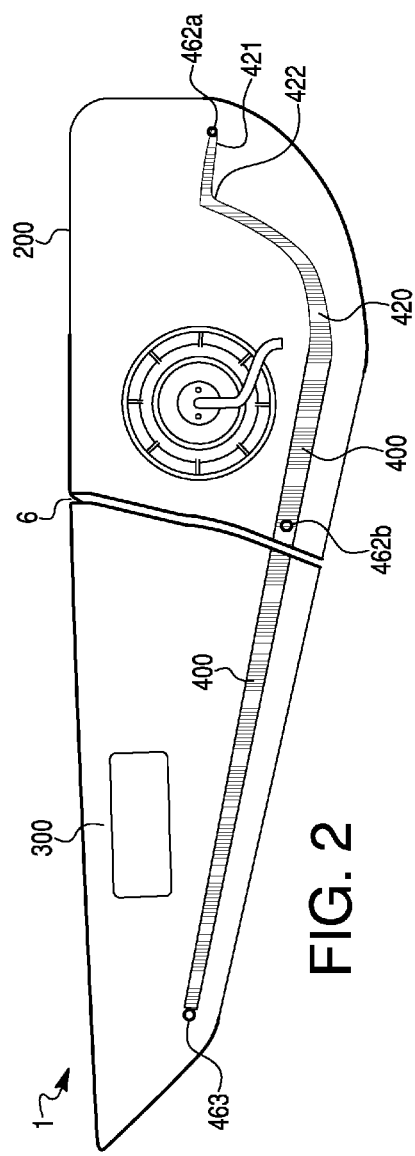

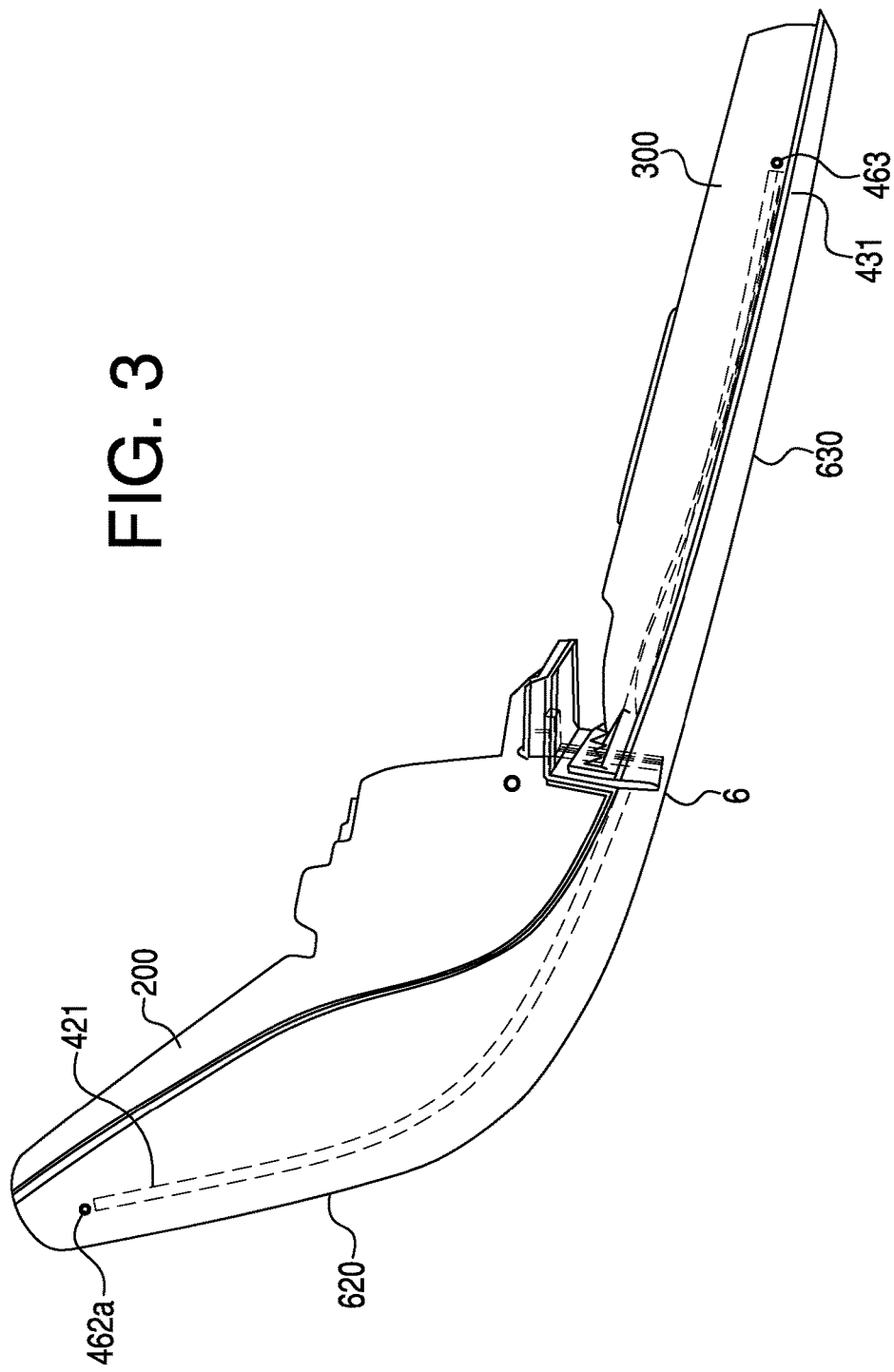

VEHICLE LIGHTING DEVICE AND METHOD

TECHNICAL FIELD

The presently disclosed subject matter relates to vehicle lamps, and in particular, a lamp for a vehicle that includes two separate lamp portions or units to be adjacently installed in a vehicle body.

BACKGROUND

The disclosed subject matter relates to a vehicle lamp in which two lamp portions are combined together across a space or gap between vehicle components, such as across a trunk lid and rear quarter panel, a trunk lid and trunk sash, a door and body panel, etc. For example, one of the lamp portions can be provided at a side area of the rear face of the vehicle main body adjacent to the rear trunk door, while the other portion is provided at the rear face of the rear trunk door/lid, so that the portions are adjacently disposed side by side in a vehicle width direction. The lamp portions can combine to have a longitudinally extending light emission portion utilizing a light guide body that extends in a width wise direction of the vehicle and then wraps around along a forwardly extending length along a side of the vehicle. The light guide body can be band-shaped and can provide an appearance to an observer as if the band-shaped or longitudinal light emission portion of the first lamp portion continues to the other band-shaped or longitudinal light emission portion of the second lamp portion.

In this configuration, however, there is a gap formed between the lamp portions or units. In order to obscure or avoid highlighting the gap, the band-shaped or longitudinal light emission portions each have an end portion configured such that the end portion of one lamp unit overlaps the end portion of the other lamp unit at the gap position. This configuration can improve a sense of unity and provides a somewhat smooth outer surface of the lighting unit as it goes from one body portion to an adjacent body portion of the vehicle.

However, because the end portions of the light guiding bodies overlap each other at the gap, light may be irregularly reflected or scattered at that area, thereby deteriorating the aesthetic feature and design and creating lighting variations that highlight the existence of the gap. The irregular reflection and scattering can also hinder the intended direction of illumination, resulting in unfavorable light distribution characteristics for the vehicle lamp.

SUMMARY

There has been a long felt need for a vehicle lighting device that is more uniform in appearance as it spans across vehicle body panels, doors, and trunk lids. Furthermore, there is a need to provide an aesthetic, integral, and uniform appearance of light without variation in light intensity across a space or a gap located between vehicle body portions. The related art is subject to various disadvantages, as noted above, including use of expensive, complicated reflecting systems and structures that result in lower performance of the lighting structures with variation in light intensity across gaps in vehicle body portions.

It may therefore be beneficial to provide a vehicle lighting structure and method that addresses at least one of the above and/or other known issues or disadvantages of the related art. In particular, it may be beneficial to utilize, according to one aspect, a structure to illuminate a gap between two vehicle lamps located adjacent to each other, including a first lamp having an outer lens including an outer lens folded part, an inner lens located inward of the outer lens. The inner lens can include an inner lens folded part folding inward from a lateral end of the inner lens. A second lamp can include an end located adjacent the outer lens folded part to form the gap between the outer lens folded part and the second lamp, wherein the first lamp includes a light guide body located inward relative to the inner lens folded part. The first lamp can include a first light source, a second light source, and a light guide body located inward relative to the inner lens folded part. The light guide body can have a longitudinal axis extending between a first distal end and a second distal end, and the first light source can be located adjacent the second distal end of the light guide body, and the second light source can be located intermediate the first distal end and the second distal end of the light guide body. The light guide body can be configured to direct light from the first light source along the longitudinal axis of the light guide body. The light guide body can include a first part having lens cuts configured as a total reflection surface, and a light emitting surface located on an inner lens side of the first part facing the inner lens. The lens cuts can be configured to reflect light from the first light source and second light source towards the light emitting surface within the light guide body, such that light emitted from the light emitting surface illuminates at least a portion of the outer lens folded part and the gap.

According to another aspect, a lighting device for a vehicle can include a structure to illuminate a gap between two vehicle lamps adjacent to each other. The structure can include a first lamp (RCL) that has an outer lens and an inner lens, each folded inwardly from a lateral end (folded part) adjacent to a second lamp (LID); a light guide body located inward relative to the folded part, a first part of the light guide body that has prismatic cuts for total reflection, and a light emitting surface of the first part that is on the inner lens side. The prismatic cuts can reflect incident light to the light emitting surface. The light emitted from the light emitting surface illuminates the folded part and the gap. According to another aspect, the structure may further include a reflector located inward relative to the light guide body.

According to another aspect, the light guide body can further include a second part, the second part extending away in a lateral direction from a point corresponding to the folded part. The second part and the first part can both be formed as one unit. The light guide body may further include a connecting part which connects between the first part and the second part.

According to another aspect, the second part radiates light for another function of vehicle lamp, such as a brake lamp, or tail light.

According to yet another aspect, a lamp assembly can include a first lamp and a second lamp, and be configured to illuminate a gap located between the first lamp and the second lamp. The first lamp can include a first outer lens, and a first light guide body portion located inward of the first outer lens and extending along a longitudinal axis from a first end to a second end. The first light guide body portion can include a light transmission portion located at the second end of the first light guide body portion. The second lamp can include a second outer lens, and a second light guide body portion located inward of the second outer lens, wherein the first outer lens of the first lamp and the second outer lens of the second lamp can be configured to define the gap therebetween. A first light source can be located adjacent the first light guide body portion. A first reflector can be located adjacent the first light guide body portion such that the first light guide body portion is located between the first reflector and the first outer lens. The first reflector can include an opening therein, wherein the first light source is located adjacent the opening in the first reflector such that light emitted from the first light source passes through the opening in the reflector and is incident on the transmission portion of the first light guide body portion.

According to another aspect of the disclosed subject matter, a lamp assembly for a vehicle can include a first lamp and a second lamp and be configured to illuminate a gap located between the first lamp and the second lamp. The first lamp can include a first outer lens, and a first light guide body located inward of the first outer lens and extending along a longitudinal axis from a first end to a second end. The first light guide body can include a first transversely extending portion that extends from the first end along the longitudinal axis to a first folded portion, a second inwardly extending portion that extends inward from the first folded portion to a second folded portion, and a light transmission portion extending from the second folded portion to the second end of the first light guide body. The second lamp can include a second outer lens, and a second light guide body located inward of the second outer lens and extending from a first end along a longitudinal axis to a second end. The first outer lens of the first lamp and the second outer lens of the second lamp can be configured to define the gap therebetween. The first end of the second light guide body can be aligned with the second end of the first light guide body such that the first light guide body and second light guide body appear as a single light guide body from a location exterior to the vehicle. A first end light source can be located adjacent the first end of the first light guide body. A second end light source can be located adjacent the second end of the second light guide body. An intermediate light source can be located adjacent and configured to emit light onto the light transmission portion of the first light guide body.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which:

FIG. 1 is a front view of a rear vehicle light assembly made in accordance with principles of the disclosed subject matter;

FIG. 2 is a rear view of the rear vehicle light assembly of FIG. 1;

FIG. 3 is a top view of the rear vehicle light assembly of FIG. 1;

DETAILED DESCRIPTION OF EXEMPLARY EMBODIMENTS

Figure 4:
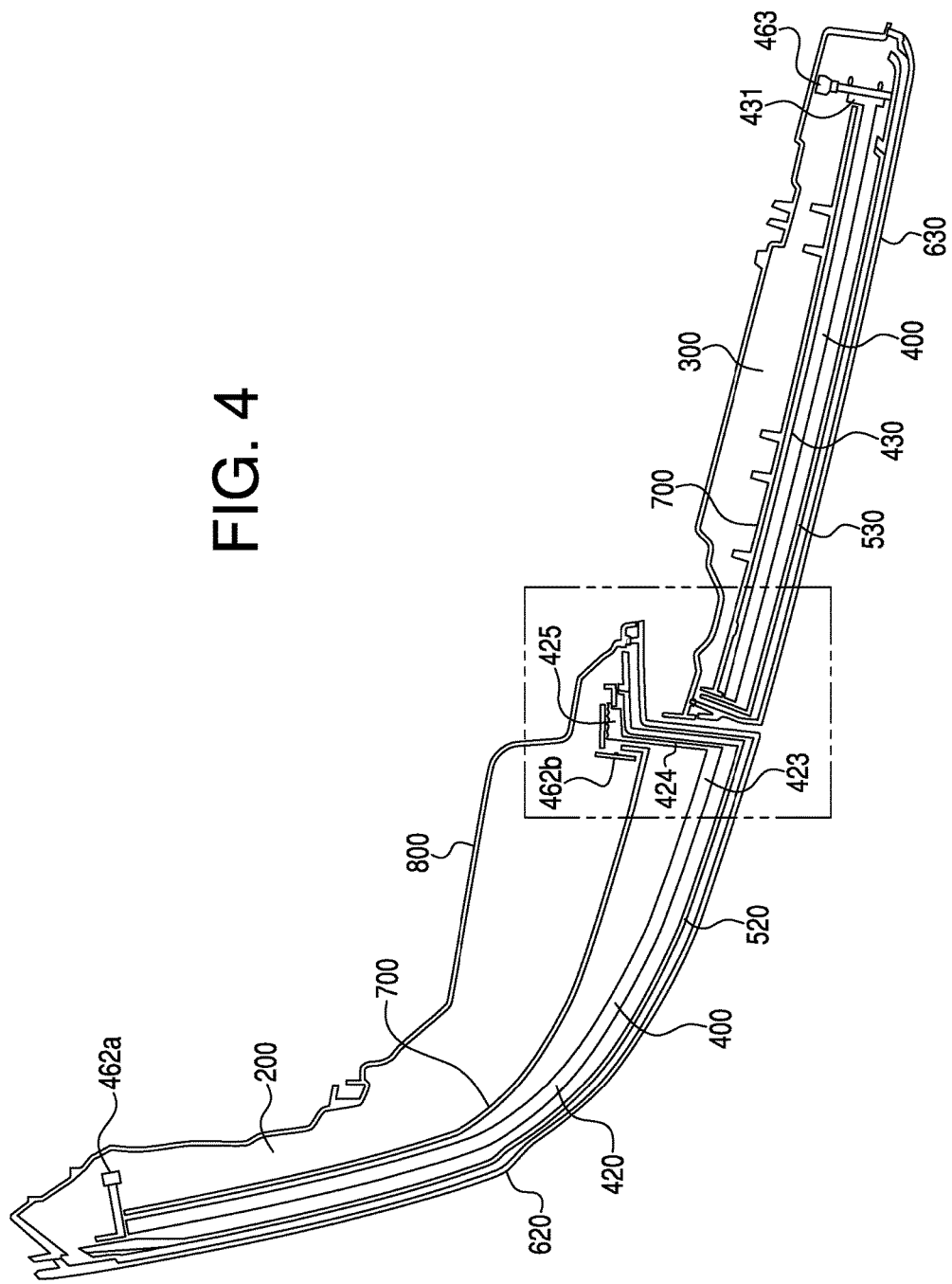
FIG. 4 is a top cross-sectional view of the rear vehicle light assembly of FIG. 1.

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

FIG. 1 illustrates a front view of an embodiment of a vehicle lamp assembly 1 made in accordance with principles of the presently disclosed subject matter. A first lamp portion 200 is located to the left in this drawing and can be configured as a rear combination lamp (RCL) that can include various different lamp portions having different functions, such as a tail light, a brake lamp, a side marker lamp, a backing lamp, etc. The first lamp portion 200 can be affixed to a first vehicle portion 2, such as but not limited to a rear quarter panel as shown in the presently depicted embodiment. The vehicle lamp assembly 1 can include a second lamp portion 300 located to the right in this drawing and attached to a second vehicle portion 3, such as but not limited to a lid of a trunk as shown in this depicted embodiment. FIG. 2 shows a rear view of the same vehicle lamp assembly 1. A light guide body 400 can extend along a longitudinal axis LA in a transverse direction across an entire extent of both the first lamp portion 200 and second lamp portion 300. In this embodiment, the longitudinal axis has linear portions and curved portions along its extent, but can be configured in many various different shapes depending on vehicle body design, regulations, and particular vehicle application. The light guide 400 can include two separate portions: a light guide first portion 420 located in the first lamp portion 200; and a light guide second portion 430 located in the second lamp portion 300. Each of the light guide first portion 420 and light guide second portion 430 can be made from a single piece of material. For example, each of the light guide first portion 420 and light guide second portion 430 can be made from a single piece of acrylic resin that has excellent light transmission properties. Of course, other materials can be used for the light guide body portions, such as plastics, ceramics, glass, crystal materials, and other materials known to have good light transmission properties. The light guide body can be manufactured using various processes, including injection molding, extrusion molding, blow molding, casting, pressing, printing, forming, and other known processes and combinations of processes. A first end 421 of the light guide can have a light source 462a configured to emit light onto the first end 421 such that light emitted from the 462a transmits along the longitudinal axis LA of the light guide first portion 420. The light guide 400 can have a folded or bending portion 422 located just interior to the first end 421. A folded portion is a portion in which an observer can see a distinct turn in the light guide body, and the turn can, for example, range from a 20 degree turn to a 340 degree turn in the light guide body longitudinal axis. The folded portion 422 allows the light guide 400 to closely follow the outer perimeter of the vehicle body as it wraps around from the side of the vehicle to a rear of the vehicle. Of course, it is not necessary to include the folded portion 422 at this location if the lamp assembly and/or vehicle body portions are configured or designed differently. Instead a straight or slightly bent portion can be provided, depending on design parameters, and can either follow closely or vary from the shape of the vehicle body and/or inner or outer lens structures. In the embodiment of FIG. 1, an intermediate light source 462b can be located adjacent an end of light guide first portion 420 that is opposite to the first end 421. A more detailed description of the relationship between the intermediate light source 462b and the light guide 400 will be provided below.

The end of the first light guide portion 420 terminates at the gap 6 that separates the first lamp portion 200 from the second lamp portion 300. The light guide 400 continues across the gap with the second light guide portion 430 that extends to a second end 431 of the light guide at which a second end light source 463 is located. Similar to the light source 462a, the light source 463 is configured to emit light into the end 431 of the light guide second portion 430 such that light is transmitted along the longitudinal axis LA of the light guide 400 to an opposite end of the light guide second portion 430 that is located immediately adjacent the gap 6. In other words, light source 462a and 463 are located at opposite ends of the light guide 400 and direct light along the light guide 400 towards each other. Thus, light reaches the gap 6 from each of the light source 462a and 463 after passing the entire extent of the light guide first portion 420 and light guide second portion 430, respectively. This configuration allows the light guide body 400 to be illuminated along its length and appear as a single light band from an exterior of the vehicle that extends across a longitudinal direction of the vehicle lamp and across the gap 6 portion located between the RCL and trunk lid.

FIG. 3 shows a top cross section view of the exemplary vehicle lamp of FIG. 1. In this view, the outer lens 630 of the second lamp portion 300 and the outer lens 620 of the first lamp portion 200 can be seen. Both the outer lens 620 and 630 are located in front of the light body 400 and actually form the physical boundary for the gap 6.

FIG. 4 shows a top cross-sectional view of the vehicle light assembly of FIG. 1. In this view, the layered structure of the different lens surfaces and light guide body are apparent. In particular, in the first lamp portion 200, the outer lens 620 is shown extending across a front of the lamp portion 200 and immediately in front of first inner lens 520, which in turn is located in front of the light guide first portion 420. Each of the outer lens 620, inner lens 520, and light guide body first portion 420 can closely follow each other (with regard to shape) along their longitudinal axes. In this embodiment, the top cross-section shows the outer lens 620, inner lens 520, and light guide body first portion 420 all extending from an outermost longitudinal end of the first lamp portion towards the gap 6 in an arched manner. Once the outer lens 620, inner lens 520, and light guide body first portion 420 reach the dotted-line box portion in FIG. 4, each of these structures includes two folded portions or bend portions that make each of these structures appear as a "reverse Z" shape from the top cross-sectional view shown in FIG. 4. After the outer lens 620, inner lens 520, and light guide body first portion 420 make their first fold, these structures then run in an inward direction towards an interior of the lamp 200. At this inward run location, the outer lens 620 forms an exterior wall that, with various portions of the second lamp portion 300, defines the gap 6 between the first lamp portion 200 and second lamp portion 300. Also, at this inward run location, the light guide first portion is defined by an inward extension portion 424 that is relatively straight and extends perpendicularly (perpendicular or substantially perpendicular) with respect to a lateral axis of a gap end extension portion 423 of the light guide body first portion 420. Then, after the second fold, the light guide body first portion 420 extends away in a lateral direction to form an intermediate gap light extension portion 425. The intermediate gap light extension portion 425 can extend perpendicularly with respect to the inward extension portion 424. The first lamp portion 200 is sealed by a housing 800 that connects to the outer lens 620 around a perimeter of the outer lens 620. A reflector can be located within the housing 800 and behind all of the light guide body first portion 420, inner lens 520, and the outer lens 620, relative to a light emitting direction of the first lamp portion 200. The reflector 700 can be configured to run along, or mimic the shape of the light guide body first portion 420 while being set back a short distance from the light guide body first portion 420.

The second lamp portion 300 can include an outer lens 630, an inner lens 530, and a light guide second portion 430. In this embodiment, the light guide second portion 430 is configured as a substantially straight (straight or almost straight), but possibly arched, single piece structure. The second end light source 463 can be located at a second end 431 of the light guide second portion 430 to direct light along the extent of the light guide second portion 430. The reflector 700 can run along and extend behind the light guide second portion 430 in order to ensure light is directed out of the lamp 300.

In this embodiment, the intermediate light source 462b is located behind the reflector and configured to emit light through an opening in the reflector 700 in order to illuminate the intermediate gap light extension portion 425 of the light guide 400. This illumination can be directed, as described in more detail below, such that the light fills the gap 6 and allows the light guide to be viewed as a single light band with little or no fluctuation or variation in light intensity along its length. In particular, it appears as if the light guide 400 spans the gap 6 with no break in light or weakness in light distribution at that location.

Figure 5:
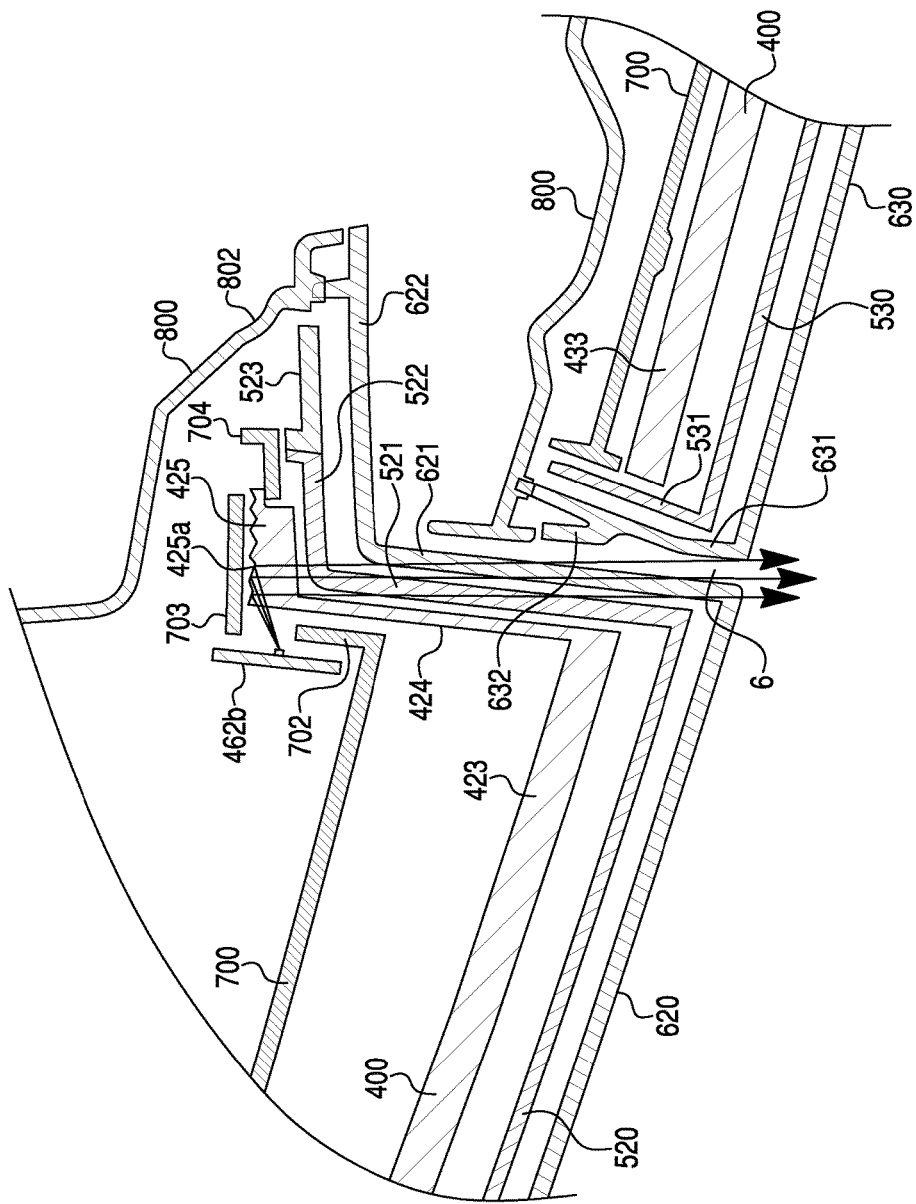
FIG. 5 is a close-up of the top cross-sectional view of FIG. 4 according to one embodiment of the disclosed subject matter.

FIG. 5 is a close-up of the top cross-sectional view of FIG. 4 located within the dotted-line box, according to one embodiment of the disclosed subject matter. In this view, the relationship between various internal structure of the vehicle lamp assembly. In the first lamp portion 200, the light guide body first portion 420, inner lens 520, and the outer lens 620 are all formed in a "reverse Z" shape that includes a first fold portion located between and separating the gap end extension portion 423 from the inward extension portion 424. A second fold portion is located at an inner end of the inward extension portion 424 and separates the inward extension portion 424 from the intermediate gap light extension portion 425. In each of the above described configurations the fold portion is an abrupt and approximate 90 degree turn. However, the fold portion can include turns of much different degree (greater or lesser) and can be composed of multiple turns. The intermediate gap light extension portion 425 extends in a lateral direction towards the second lamp portion 300 and includes a light incident surface that faces the intermediate light source 462b. The intermediate gap light extension portion 425 includes an inner surface in which lens cuts 425a can be provided such that the inner surface of the intermediate gap light extension portion 425 acts as a "total reflection surface." Thus, light from the light source 462b that is incident on the light incident surface travels through the intermediate gap light extension portion 425 and is reflected outward by the lens cuts 425a in the inner surface towards an outer light emitting surface of intermediate gap light extension portion 425 that is opposed to the inner surface with lens cuts 425a. It is also contemplated that lens cuts could be located on the outer surface instead of, or in addition to, the inner surface of the intermediate gap light extension portion 425.

As shown by the three arrows in FIG. 5, light that is reflected by the lens cuts 425a travels through and is emitted from an outer surface of the intermediate gap light extension portion 425 and subsequently travels through the inner lens 520, the outer lens 620 and then through gap 6 to fill the gap with light. Some light may also pass through the outer lens 630 and inner lens 530 of the second lamp portion 300.

The reflector 700 can have an inner extension 702 that is spaced from a gap portion 703 to form an opening in the reflector 700. The intermediate light source 462b can be positioned such that most or all of the light emitted from the intermediate light source 462b passes through this opening defined in the reflector 700 and onto the light incident surface of the intermediate gap light extension portion 425. The reflector 700 can include an attachment portion 704 for securing the intermediate gap light extension portion 425 in place in the first lamp portion 200.

The inner lens 520 can have a similar shape as the light guide first portion 420. In particular, the inner lens 520 can extend laterally across (from left to right in FIG. 5) until it reaches a first fold portion, and can include a gap inward extension portion 521 that extends inward (into the lamp 200) from the first fold portion in the inner lens 520. The gap inward extension portion 521 extends inward from the first fold portion to a second fold portion located adjacent the intermediate gap light extension portion 425 of the light guide first portion 420. The inner lens 520 then continues along a gap continuance end portion 522 perpendicularly with respect to the gap inward extension portion 521 to the end of the inner lens 520. A housing connecting portion 523 can located adjacent the reflector attachment portion 704 for securing the end of the inner lens within the lamp 200.

The outer lens 620 can also extend laterally from a left side in the present figure towards the gap 6 until it reaches a fold portion. The outer lens 620 can then extend perpendicularly inward along a gap inward extension portion 621. This gap inward extension portion 621 actually defines a lateral (left) most extent of the gap 6 between the first lamp portion 200 and second lamp portion 300. The gap inward extension portion 621 extends inward until it reaches a second fold portion at which point the outer lens 620 then extends in a lateral direction again (substantially parallel with the original left to right lateral direction of the outer lens 620) to form a gap continuance end portion 622 that extends and connects to a first end gap connection 802 of housing 800.

In other words, the first portion of the light guide 420 extends towards the gap 6 in a first direction and then turns abruptly inwardly and extends in a second direction towards the interior of the vehicle (to which the vehicle lamp assembly 1 is attached), and then turns abruptly again to continue in a third direction that is substantially parallel with the first direction. The inner lens 520 and outer lens 620 can be similarly configured so as to trace a similar shape in front of the light guide first portion 420. A reflector 700 including an inner extension 702 can be located behind the light guide first portion 420 such that light that passes through the light guide first portion 420 extending in the third direction is reflected towards the gap 6 between the rear combination lamp (RCL) and the LID lamp portions, as well as major light emitting direction of the RCL lamp. The RCL portion is located to the left in this drawing, and the LID or trunk lamp portion is at the right in this drawing. The LID lamp portion can include a second straight light guide 400 that is encased between the housing 800 and both the inner lens 530 and outer lens 630.

Figure 6:
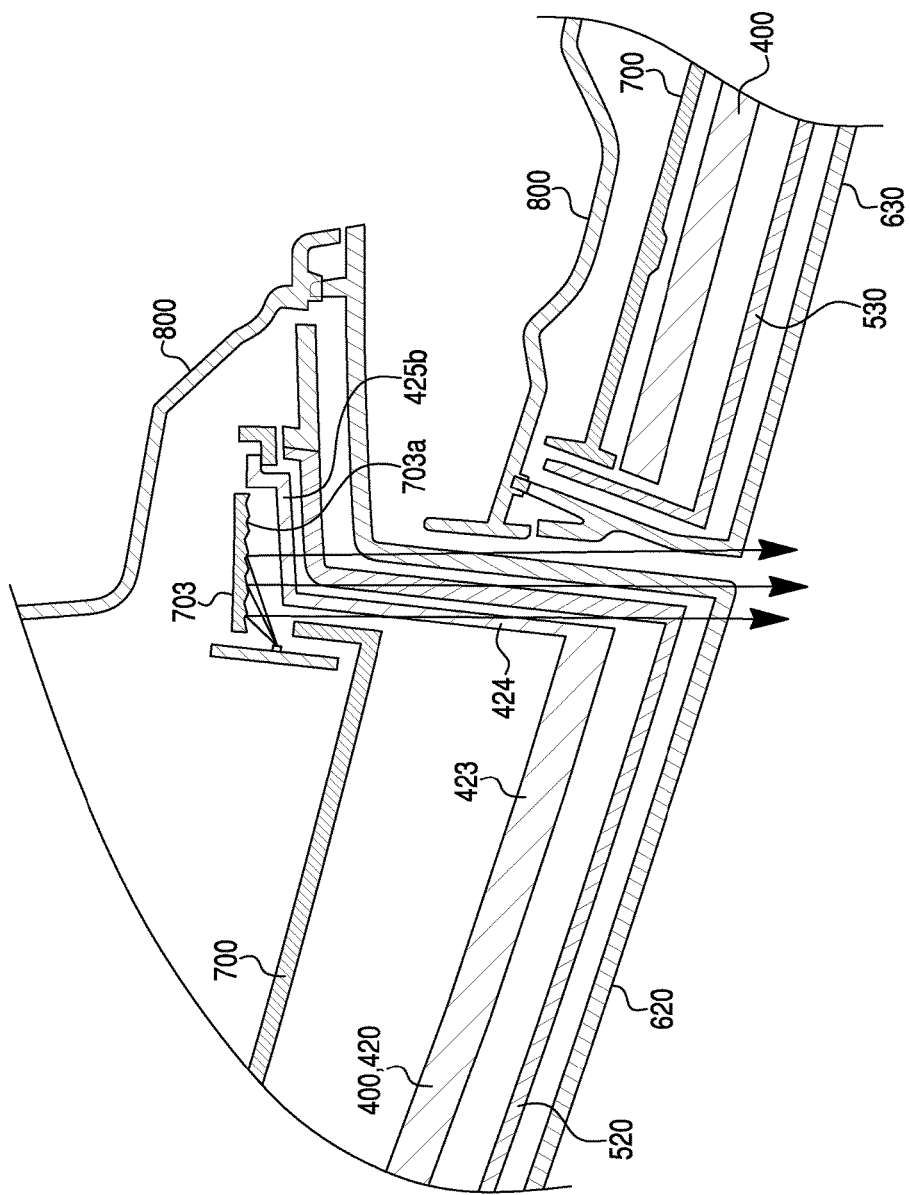
FIG. 6 is a close-up of the top cross-sectional view of FIG. 4 according to another embodiment of the disclosed subject matter.

The outer lens 630 of the second lamp portion 300 can include a gap inward extension portion 631 that forms a wall defining a rightmost lateral extent of the gap 6. The gap inward extension portion 631 can include a Y-portion 632 at a terminal end with one branch connecting to the housing 800 and another branch continuing as the wall defining the gap 6 between the lamp portions 200, 300. The inner lens 530 can also include a fold portion FIG. 6 is a close-up of the top cross-sectional view of FIG. 4 according to another embodiment of the disclosed subject matter. In this embodiment, the intermediate gap light extension portion 425 of the light guide 400 is formed in a much thinner fashion as compared to the previously described example. Thus, light emitted from the intermediate light source 462b is not incident on a side surface of the intermediate gap light extension portion 425, and instead travels through an opening between the reflector gap portion 703 and the intermediate gap light extension portion 425. Optic cuts, for example, prism cuts 703a, can be located on the reflector gap portion 703 to cause light received from the intermediate light source 462b to change direction and be incident upon the inner surface of the intermediate gap light extension portion 425b. The light then travels through the light guide first portion 420, specifically the inward extension portion 424 and the gap extension 423, inner lens 520 and outer lens 620 to fill the gap 6 located between the first lamp portion 200 and second lamp portion 300. In this embodiment, the second lamp portion 300 can be configured the same as in FIG. 5.

In other words, the first light guide portion 420 includes a light guide in the RCL lamp portion that extends towards the gap 6 in a first direction and then turns abruptly inwardly and extends in a second direction towards the interior of the vehicle (to which the vehicle lamp is attached), and then turns abruptly again to continue in a third direction that is substantially parallel with the first direction. The inner lens 520 and outer lens 620 can be similarly configured so as to trace a similar shape in front of the light guide 420. A reflector 700 can be located behind the light guide 400 such that light that passes through the light guide portion extending in the third direction is reflected by the reflector 700 towards the gap 6 between the rear combination lamp (RCL) and the LID lamp portions. In addition, a light source (the intermediate light source 462b) can be located at an opening in the reflector 700 located behind the light guide 400 at a juncture between the portions that extend in the second and third directions. The reflector 700 including the reflector gap portion 703 can include cuts, such as prism cuts, located on a surface of the reflector that faces a rear of the light guide 400 that extends in the third direction. In this embodiment, light is reflected by the reflector towards a rear surface of the light guide 400 that extends in the third direction and toward the gap 6. Diffusion cuts can be located at various locations of the light guide 400, and inner lens 520 to diffuse or direct light in accordance with a particular application. The LID lamp portion at the right in the figure can include a straight (or somewhat arched) portion of light guide 400 that is encased between the housing 800 and both the inner lens 530 and outer lens 630 and can also include diffusion or directional cuts in a surface thereof, while the remaining structure can be identical to that of the embodiment depicted in FIG. 5.

Alternative Embodiments

While certain embodiments of the invention are described above, and FIGS. 1-6 depict particular structures, it should be understood that many variations of the structures can fall within the scope of the disclosed subject matter. For example, the color and type of materials can vary depending on the intended application of the vehicle light assembly 1. Also, the described embodiments relate to a left side rear vehicle lamp assembly. However, the same principles can be applied to a right side rear vehicle lamp assembly. Further, the principles can be applied to any application where a light assembly crosses over a gap in vehicle panels, such as between the trunk lid and trunk lower lip, between the RCL and trunk Lid lamp, between the RCL and trunk lower lip, between vehicle doors, between a vehicle door and vehicle panel, along a front portion of a vehicle between hood and front grill surface, between front lighting areas and side quarter panels, etc. When an intermediate lamp 462*b* is used, the reflector structure can be configured in a manner such that the actual intermediate lamp structure is not visible from an exterior of the vehicle through the gap 6. In such a case, only the illumination of the light guide body 400 (caused by the intermediate lamp 462*b*) is visible from points exterior to the vehicle lamp assembly 1.

While the subject matter has been described in detail with reference to exemplary embodiments thereof, it will be apparent to one skilled in the art that various changes can be made, and equivalents employed, without departing from the scope of the invention. All related art references discussed in the above Description of the Related Art section are hereby incorporated by reference in their entirety.

What is claimed is:

1. A structure to illuminate a gap between two vehicle lamps located adjacent to each other, comprising:
    a first lamp including,
        an outer lens including an outer lens folded part,
        an inner lens located inward of the outer lens and including an inner lens folded part folding inward from an outer lateral end of the inner lens; and
    a second lamp including an end located adjacent the outer lens folded part to form the gap between the outer lens folded part and the second lamp, wherein
    the first lamp includes a first light source, a second light source, and a light guide body located inward relative to the inner lens folded part, the light guide body having a longitudinal axis extending between a first distal end and a second distal end, the first light source is located adjacent the second distal end of the light guide body, and the second light source is located intermediate the first distal end and the second distal end of the light guide body, the light guide body configured to direct light from the first light source along the longitudinal axis of the light guide body, the light guide body including a first part having lens cuts configured as a total reflection surface, and a light emitting surface located on an inner lens side of the first part facing the inner lens, and the lens cuts are configured to reflect light from the first light source and second light source towards the light emitting surface within the light guide body, such that light emitted from the light emitting surface illuminates at least a portion of the outer lens folded part and the gap.

2. The structure of claim 1 further comprising:
    a reflector located inward relative to the light guide body.

3. The structure of claim 1, wherein the light guide body further includes a second part, the second part extends away in a lateral direction from a point adjacent to the inner lens folded part.

4. The structure of claim 3, wherein the light guide body second part and the light guide body first part are both formed as one integral unit.

5. The structure of claim 3, wherein the light guide body includes a connecting part that connects the light guide body first part to the light guide body second part.

6. The structure of claim 3, wherein the light guide body second part radiates light for at least one function of the first lamp including at least one of a brake lamp function and a tail light function.

7. The structure of claim 1, wherein the lens cuts are at least one of optic cuts, prismatic cuts, trapezoidal cuts, and double focus cuts.

8. The structure of claim 1, wherein the first lamp is a rear combination lamp and the second lamp is a trunk lid lamp.

9. The structure of claim 1, further comprising:
    a reflector located inward relative to the light guide body, the reflector including an opening, wherein the second light source is an intermediate light source located adjacent the opening in the reflector such that light from the intermediate light source passes through the reflector and is incident on a side surface of the first part of the light guide body, the side surface extending perpendicularly with respect to the total reflecting surface.

10. The structure of claim 1, wherein the light guide body further includes a second part extending away in a lateral direction to an outer lateral end, and a connecting part that extends from and connects an inner lateral end of the light guide body second part to the light guide body first part, the connecting part extends in an inward direction away from the inner lateral end of the light guide body second part to the light guide body first part.

11. The structure of claim 10, wherein the first light source is an end light source located at the outer lateral end of the light guide body.

12. A lamp assembly including a first lamp and a second lamp, the lamp assembly configured to illuminate a gap located between the first lamp and the second lamp, the lamp assembly comprising:
    the first lamp including,
        a first outer lens, and
        a first light guide body portion located inward of the first outer lens and extending along a longitudinal axis from a first end to a second end, the first light guide body portion including a light transmission portion located at the second end of the first light guide body portion;
    the second lamp including,
        a second outer lens, and
        a second light guide body portion located inward of the second outer lens, wherein the first outer lens of the first lamp and the second out lens of the second lamp are configured to define the gap therebetween;
    a first light source located adjacent the first light guide body portion; and
    a first reflector located adjacent the first light guide body portion such that the first light guide body portion is located between the first reflector and the first outer lens, and the first reflector including an opening therein, wherein the first light source is located adjacent the opening in the first reflector such that light emitted from the first light source passes through the opening in the reflector and is incident on the transmission portion of the first light guide body portion.

13. The lamp assembly according to claim 12, further comprising:
    a second light source located at an end of the second light guide body portion; and
    a third light source located at the first end of the first light guide body portion.

14. The lamp assembly according to claim 12, further comprising:

a first inner lens located between the first outer lens and the first light guide body portion, wherein the reflector and light emission portion of the first light guide body portion are configured such that light emitted from the first light source is reflected by the reflector and then passes in sequence through the light transmission portion of the first light guide body portion, the inner lens, the outer lens, and finally through the gap.

15. The lamp assembly according to claim 12, wherein the first light guide body portion includes a first folded portion and a second folded portion along a longitudinal length of the first light guide body portion such that the first light guide body portion comprises a first portion that extends in a first direction, a second portion separated from the first portion by the first folded portion, the second portion extending in a direction perpendicularly inward relative to the first portion to the second folded portion, and a third portion extending from the second folded portion to the second end and including the light transmission portion.

16. The lamp assembly according to claim 15, wherein the third portion is spaced from the reflector by a first spatial distance, and a portion of the reflector that faces the third portion includes prism cuts such that light emitted from the first light source is reflected by the prism cuts on the reflector and passes through the first spatial distance toward a light incident surface of the third portion of the first light guide body portion that faces towards the reflector.

17. The lamp assembly according to claim 15, wherein the third portion includes a prism cut surface facing the reflector, a side surface facing the first light source, and a light emitting surface opposed to the prism cut surface and facing the gap.

18. A lamp assembly for a vehicle including a first lamp and a second lamp, the lamp assembly configured to illuminate a gap located between the first lamp and the second lamp, the lamp assembly comprising:
the first lamp including,
a first outer lens, and
a first light guide body located inward of the first outer lens and extending along a longitudinal axis from a first end to a second end, the first light guide body including a first transversely extending portion that extends from the first end along the longitudinal axis to a first folded portion, a second inwardly extending portion that extends inward from the first folded portion to a second folded portion, and a light transmission portion extending from the second folded portion to the second end of the first light guide body;
the second lamp including,
a second outer lens, and
a second light guide body located inward of the second outer lens and extending from a first end along a longitudinal axis to a second end, wherein the first outer lens of the first lamp and the second out lens of the second lamp are configured to define the gap therebetween, and the first end of the second light guide body is aligned with the second end of the first light guide body such that the first light guide body and second light guide body appear as a single light guide body from a location exterior to the vehicle;
a first end light source located adjacent the first end of the first light guide body;
a second end light source located adjacent the second end of the second light guide body; and
an intermediate light source located adjacent and configured to emit light onto the light transmission portion of the first light guide body.

19. The lamp assembly of claim 18, further comprising:
a first reflector located adjacent the first light guide body such that the first light guide body is located between the first reflector and the first outer lens, and the first reflector including an opening therein, wherein the intermediate light source is located adjacent the opening in the first reflector such that light emitted from the intermediate light source passes through the opening in the reflector and is incident on the light transmission portion of the first light guide body.

20. The lamp assembly of claim 19, wherein at least one of the first reflector and the light transmission portion of the first light guide body includes prism cuts configured to direct light received from the intermediate light source towards the gap via the light guide body and first outer lens.

* * * * *